US006765384B2

(12) United States Patent
Morys

(10) Patent No.: US 6,765,384 B2
(45) Date of Patent: Jul. 20, 2004

(54) METHOD AND APPARATUS EMPLOYING PHASE CYCLING FOR REDUCING CROSSTALK IN DOWNHOLE TOOLS

(75) Inventor: Marian Morys, Downingtown, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/186,415

(22) Filed: Jul. 1, 2002

(65) Prior Publication Data

US 2004/0000911 A1 Jan. 1, 2004

(51) Int. Cl.[7] .............................. G01V 3/08; G01V 3/18
(52) U.S. Cl. ..................................... 324/338; 324/339
(58) Field of Search ............................... 324/338–343, 324/613, 225; 327/72, 310, 551; 455/296, 304–306; 242/203

(56) References Cited

U.S. PATENT DOCUMENTS

| | | | | |
|---|---|---|---|---|
| 3,230,445 A | * | 1/1966 | Sloughter et al. ........... 324/339 |
| 4,173,665 A | | 11/1979 | Nida ........................... 342/104 |
| 4,190,799 A | | 2/1980 | Miller et al. ................. 324/239 |
| 4,415,895 A | * | 11/1983 | Flagg ...................... 324/339 X |
| 4,945,307 A | * | 7/1990 | Tornblom ................... 324/225 |
| 5,010,526 A | | 4/1991 | Linville, Jr. et al. |
| 5,109,533 A | * | 4/1992 | Mine et al. ............. 455/305 X |
| 5,345,179 A | | 9/1994 | Habashy et al. ............ 324/338 |
| 5,434,507 A | | 7/1995 | Beren et al. ................. 324/338 |
| 5,463,319 A | * | 10/1995 | Chesnutt et al. ............ 324/339 |
| 5,539,321 A | | 7/1996 | Sciacero et al. ............ 324/628 |
| 5,781,436 A | * | 7/1998 | Forgang et al. .......... 324/343 X |
| 5,869,968 A | * | 2/1999 | Brooks et al. ........... 324/338 X |
| 5,959,456 A | | 9/1999 | Whorlow et al. ............ 324/662 |
| 5,970,185 A | | 10/1999 | Baker et al. ..................... 385/3 |
| 6,108,605 A | * | 8/2000 | Doyle et al. ............ 324/339 X |
| 6,359,438 B1 | * | 3/2002 | Bittar .......................... 324/369 |

FOREIGN PATENT DOCUMENTS

| | | | |
|---|---|---|---|
| JP | 401086795 A | 9/1989 | ................. 381/94.3 |
| JP | 411110706 A | 4/1999 | ............ G11B/5/02 |
| JP | 411347036 A | 12/1999 | ............ A61B/8/06 |
| WO | WO 97/26559 | 7/1997 | |

* cited by examiner

*Primary Examiner*—N. Le
*Assistant Examiner*—Reena Aurora
(74) *Attorney, Agent, or Firm*—Mark E. Scott; Conley Rose, P.C.

(57) ABSTRACT

An apparatus and method for reducing crosstalk and other noise sources in downhole tools is disclosed. Due to confined space in the downhole tool environment and the fact that the transmit path utilizes significantly more electrical power than the receive path, electromagnetic noise easily couples between adjacent circuitry. The specification discloses a phase-reversal element that can selectively allow the received signal to pass unaffected, or which can cause a phase reversal of the received signal. A digital signal processor samples the received signal, which after receipt but before sampling has noise induced thereon. Thereafter, the digital signal processor samples the phase reversed received signal, which likewise has the noise induced thereon after receipt but before sampling. Subtracting the first sampled signal from the second produces a resultant signal in which the noise is substantially reduced.

5 Claims, 5 Drawing Sheets

METHOD AND APPARATUS EMPLOYING PHASE CYCLING FOR REDUCING CROSSTALK IN DOWNHOLE TOOLS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are generally directed to reducing crosstalk and other noise sources in downhole tools. More particularly, the preferred embodiments are directed to implementing a phase-reversal element that enables an electromagnetic resistivity tool's circuitry to quantify and/or nullify crosstalk and other noise sources.

2. Background of the Invention

In the exploration and production of hydrocarbons in an underground reservoir or formation, it is often desirable to have downhole parameters and information readily available. For example, when exploring a formation by drilling, it is desirable to know formation properties in order to determine if a reservoir has been encountered. Methods and apparatuses for determining and measuring downhole parameters are well known in the art, and may include generating an electromagnetic stimulus using transmit circuitry that penetrates the formation while the formation's response to the electromagnetic stimulus is acquired with receive circuitry.

Due to confined downhole conditions, the electromagnetic transmit and receive circuitry are often located in close proximity to each other. Additionally, because of formation attenuation, the receive circuitry operates at a lower power level (e.g. several orders of magnitude) than that of the transmit circuitry, causing almost any electromagnetic interference (EMI) generated by the transmit circuitry to affect the operation of the receive circuitry drastically. This contamination of EMI between the transmit and receive circuitry leads to a condition commonly know as crosstalk.

Current trends in attempting to solve crosstalk and other noise related problems in downhole applications include separating the transmit and receive circuitry physically, but this may lead to, among other things, redundant power circuitry. Filtering circuitry that the transmit/receive circuits share (e.g. power supplies, reference oscillators, etc.) has also been attempted, but it does not provide the desired performance. Shielding the affected circuit may also be employed in effort to reduce crosstalk, however, this is often relatively expensive and does not provide adequate performance.

Thus, there is a need for an apparatus and method to reduce crosstalk in downhole tools that is both cost effective and also provides improvements in the desired level of performance.

BRIEF SUMMARY OF SOME OF THE PREFERRED EMBODIMENTS

The problems noted above are solved in large part by a phase-reversal element employed so that the phase of the signal coming from a receive sensor, which represents the formation's response to the electromagnetic stimulus, may be reversed prior to being processed by the receive circuitry. As such, the phase-reversal element is preferably located in close physical proximity to the sensor so that the maximum amount of crosstalk between the transmit circuitry and the receive circuitry is reduced by subsequent digital signal processing circuitry. In the preferred embodiments, the signals processed by subsequent circuitry are a composition of the original signal measured by the sensor, followed by a phase-reversed version of the same signal. The receive circuitry then applies the remainder of the analog and digital signal processing to the resultant signal, where the crosstalk may be both quantified and nullified digitally.

In another embodiment, a phase-reversal element may be employed at any point in the receive path circuitry. In this manner, the subsequent digital signal processing circuitry may quantify and nullify any crosstalk or noise that comes after the phase-reversal element. For example, if it is known that the signal conditioning circuitry is the most susceptible to crosstalk, then the phase-reversal element may be employed just before the signal conditioning circuitry. Therefore, if it is undesirable to implement the phase-reversal element in close proximity to the sensor, placing it proximate to elements that are known to be more susceptible than others may be an alternative embodiment.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a more detailed understanding of the preferred embodiments, reference is made to the accompanying Figures, wherein like parts throughout the drawings are marked with the same reference numerals.

NOTATION AND NOMENCLATURE

Figure 1:
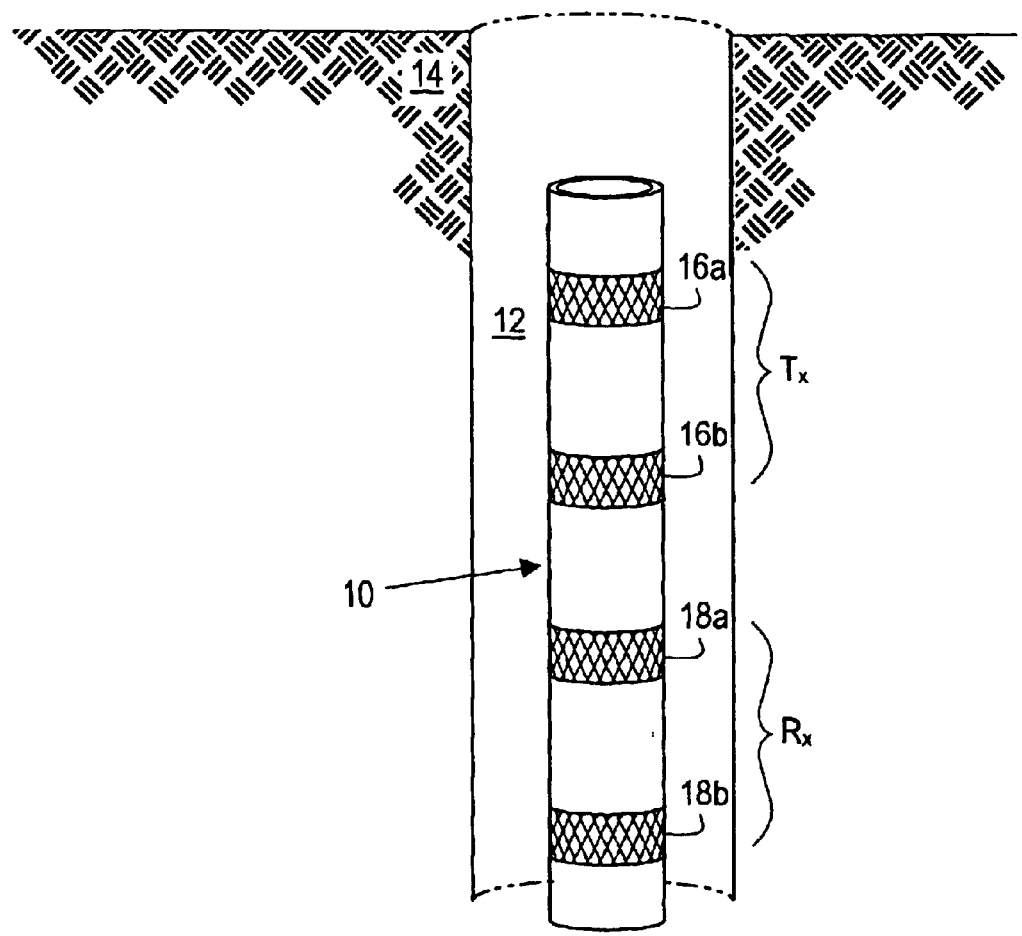
FIG. 1 shows a downhole logging tool.

Certain terms are used throughout the following description and claims to refer to particular system components. As one skilled in the art will appreciate, oilfield service companies, and tool manufacturers may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or mechanical connection. Thus, if a first device couples to a second device, that connection may be through a direct electrical or mechanical connection, or through an indirect electrical or mechanical connection via other devices and connections.

DETAILED DESCRIPTION OF THE PREFERRED EMBODIMENTS

The preferred embodiments of the present invention relate to methods and apparatuses that employ phase cycling in reducing crosstalk in downhole electromagnetic resistivty tools, and may also find application in other tools, such as acoustic tools. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It should be understood that the phase-reversal element, as described below, itself does not reduce of crosstalk; rather, the addition of the phase-reversal element allows the digital signal processor to reduce or quantify the crosstalk in the final signal by isolation of the crosstalk component in a comparison of the received signal, and a phase reversed version of the received signal.

Referring now to FIG. 1, a logging tool 10 used to determine and acquire information in the exploration and production of hydrocarbons in an underground reservoir or formation is shown. FIG. 1 shows the logging tool 10 located in a wellbore 12 that passes through a formation 14. The tool may include multiple transmitters 16a and 16b, as well as multiple receivers 18a and 18b. In the preferred embodiments, transmitters 16 and receivers 18 are toroidal or solenoid antennas for use in a tool for determining resistivity of downhole formations using electromagnetic radiation; however, transmitters 16 and receivers 18 may include other types of antennas and downhole sensors, such as acoustic sensors. The logging tool 10 is preferably a portion of a bottom hole assembly (BHA), but it is not so limited, and in fact the logging tool 10 also renders itself to wireline applications.

Figure 2:
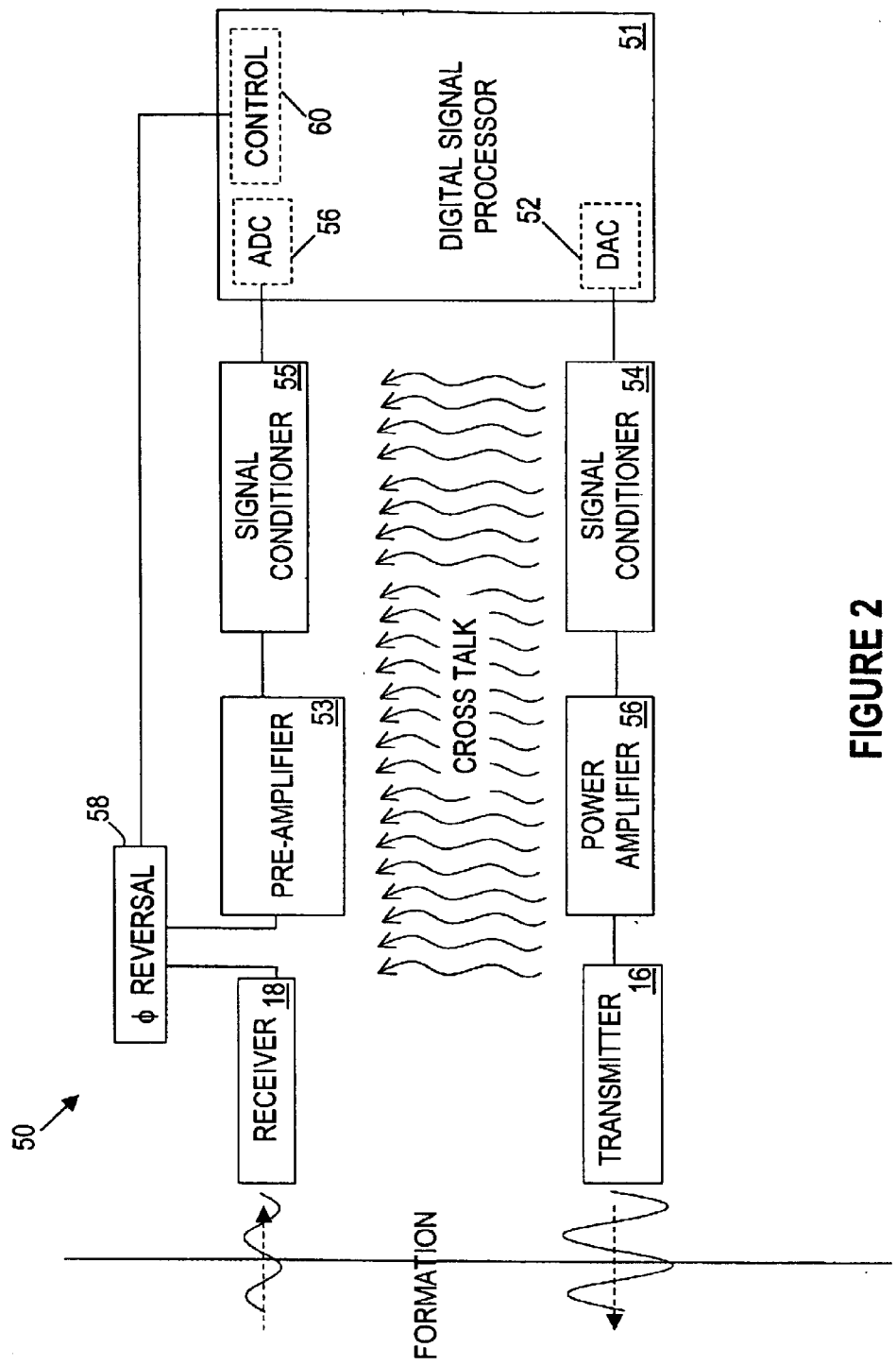
FIG. 2 shows a block diagram of an electrical system for downhole measurement.

FIG. 2 shows an electrical system 50 of the preferred embodiment, which comprises a digital signal processor (DSP) 51 that executes algorithms used to determine formation properties. The DSP 51 uses these algorithms both in generating signals to be transmitted into formations and in processing signals returning from formations. The DSP 51 generally comprises a digital to analog converter (DAC) 52 which takes the digital signal and generates an analog equivalent. The analog signal generated by the DAC 52 may have properties that are undesirable (e.g. DC offset voltages, limited current and voltage, etc.), and therefore further analog signal processing using a signal conditioner 54 may be required. Signal conditioner 54 preferably performs, among other things, level shifting in order to prepare the signal to be amplified by power amp 56. Amplification of the electromagnetic signal is often necessary before transmission into the formation so that sufficient signal strength is provided. Sufficient signal strength not only ensures adequate penetration of the electromagnetic signal, but also ensures the signal received from the formation has the desired signal to noise ratio in the receive circuitry. For example, it is common for the magnitude of the transmitter excitation to be in the ampere range. Finally, a transmitter 16 emits an electromagnetic representation of the signal into the formation, as is familiar to one of ordinary skill in the art.

Figure 3A:
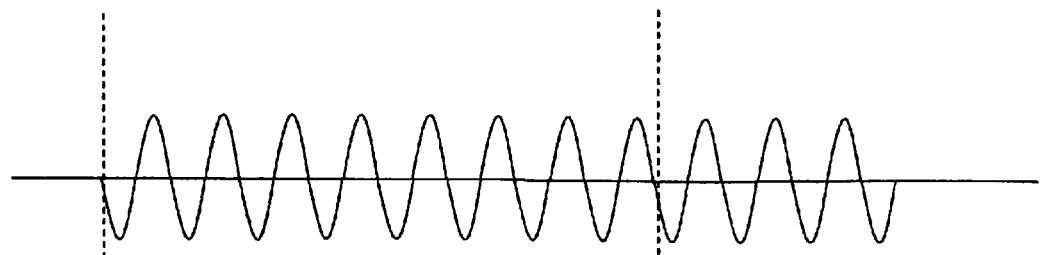
FIG. 3A shows an exemplary signal as received by a receiver.

A receiver 18 detects the returning electromagnetic signal, whose amplitude and phase are indicative of the formation's properties. FIG. 3A shows an example signal as received by receiver 18. Typically, the amplitude of the received response signal is attenuated many orders of magnitude lower than that of the transmitted signal (e.g. in the microampere or milliampere range) and therefore requires amplification prior to analysis. As will be discussed in more detail below, a phase-reversal element 58 (controlled by a programmable phase control circuit 60), preferably couples the detected signal, or its phase-reversed version, to a pre-amplifier 53. The pre-amplifier 53 is used to amplify the signal, which is then passed to a signal conditioner 55. The signal conditioner 55 further prepares (e.g. level shift, filtering, etc.) the signal for the analog to digital converter (ADC) 56. The ADC 56 preferably converts the received signal into digital form so that the DSP 51 can determine the formation properties.

Figure 3B:
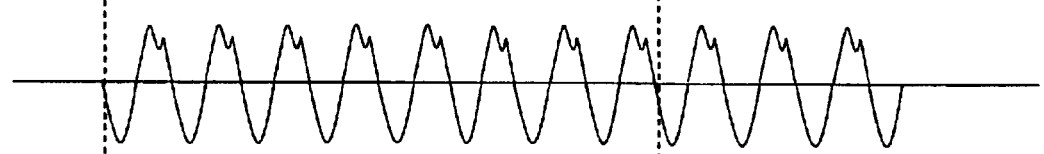
FIG. 3B shows the received signal of FIG. 3A including crosstalk and without any correction.

However, in generating a high power electromagnetic signal for adequate formation penetration and signal-to-noise ratio at receiver 18, the transmission path circuitry (i.e. signal conditioner 54, power amp 56, and transmitter 16) also generates electromagnetic interference (EMI). Additionally, due to confined space downhole, and particularly within the downhole tool 10, the transmission and receive paths typically are in close proximity so that the EMI affects the received signal in the adjacent receive circuitry. This phenomena is known as crosstalk. It should be noted that the crosstalk may be introduced at any point along the receive path, and one element of the receive path may be more susceptible to crosstalk than other elements. FIG. 3B shows and exemplary incoming signal affected by crosstalk. So while the waveform of FIG. 3A exemplifies the received signal as it leaves receiver 18, crosstalk distorts the signal as it propagates through the various receive path components. FIG. 3B exemplifies the received signal as it is sensed by the ADC 56. It will be understood that the waveforms of FIGS. 3A and 3B (as well as FIGS. 3D and 3E) are simplified for purposes of explaining the preferred embodiments. Relative amplitudes, as well as the crosstalk components shown, are not necessarily those seen in an actual device, but are provided to simplify the description.

Figure 3C:
FIG. 3C shows an exemplary control signal from a programmable phase control element.
Figure 3D:
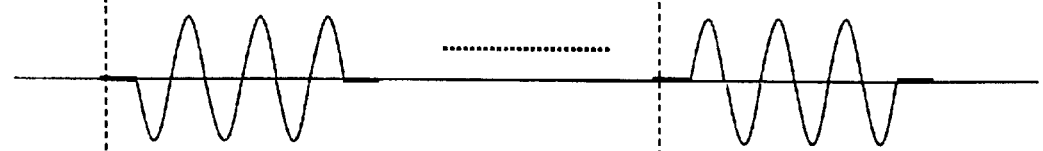
FIG. 3D shows a phase cycled version of the signal of FIG. 3A using a phase-reversal element.
Figure 3E:
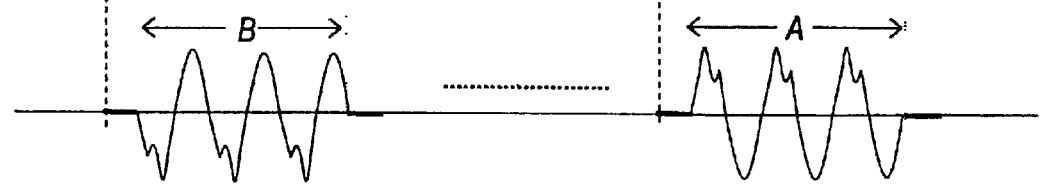
FIG. 3E shows the signal of FIG. 3D including crosstalk and ready for digital quantification and nullification.

The phase-reversal element 58 and its operation in correcting crosstalk will now be discussed in detail. The programmable phase control element 60 is preferably included in DSP 51, and provides control for the phase-reversal element 58. This control is robust in that it may power down the phase-reversal element 58 and/or it may cause the phase-reversal element to cycle between phase states. For example, the programmable phase control element 60 may produce a pulse width modulated control signal as shown in FIG. 3C, which when applied to the phase reversal element 58 either couples the signal received from the receiver 18, or a phase-reversed version, as shown in FIG. 3D. The coupled signal from the phase-reversal element would then be subject to the typical noise and crosstalk as would be introduced in the receive path between the output of the phase-reversal element 58 and the input of DSP 51, as shown in FIG. 3E. Moreover, the phase-reversal element 58 provides subsequent phase-cycles to DSP 51 where the desired information has an opposite phase from cycle to cycle, yet the noise induced because of crosstalk between the transmit and receive circuitry has the same phase from cycle to cycle. Upon arrival at the DSP 51 the signal is then digitized using the ADC 56, so that the DSP 51 may then utilize the signal to quantify and/or nullify any noise or crosstalk introduced into the line after the phase-reversal element 58. Referring to FIG. 3E, cycle B represents the phase cycle including any induced noise and crosstalk introduced in the receive path, and cycle A represents a phase-reversed version. The received signal has an opposite phase in phase cycle A than it does in phase cycle B, while the crosstalk has the same phase in both phase cycles. Accordingly, the DSP may compare the signals of the two phases cycles A and B to determine the crosstalk component. While the comparison of the two signals (and the embedded crosstalk) may take many forms, in the preferred embodiments the DSP 51 subtracts the signals, on a point by point basis. The subtraction of the signals from phase cycles A and B has a resultant a scaled received signal free from the crosstalk component. Equation (1) through (3) below describe the process more mathematically:

$$A_1 = S + C \quad (1)$$

$$(-)A_2 = -S + C \quad (2)$$

$$R = 2S \quad (3)$$

where $A_1$ is the composite received signal comprising the received signal S and the crosstalk component C, $A_2$ is the composite signal received comprising a phase-reversed version of the received signal S (indicated by a leading negative sign) and the crosstalk component C, and R is the resultant signal (equal to 2S) created by the addition of signals $A_1$ and $A_2$. Thus, the DSP 51 may perform further calculations necessary to ascertain formation properties with a resultant substantially free from crosstalk. Indeed, it is believed that using the phase-reversal element 58 to compensate for crosstalk provides at least a 40-dB improvement over the non-compensated case.

Alternatively, the DSP may add the signals of the phase cycles A and B to reveal the crosstalk. This situation is shown mathematically in equations (4) through (6) below.

$$A_1 = S + C \quad (4)$$

$$(+)A_2 = -S + C \quad (5)$$

$$R = 2C \quad (6)$$

It is seen then that in the case of addition of the two signals from the phase cycles, the resultant signal is a scaled version of the crosstalk experienced by the receive circuits. In another embodiment, the DSP 51 may periodically monitor the overall noise floor of the tool using the resultant signal produced by addition of the signals from the two phase cycles, thereby providing insight into developing problems and enabling a user to predict costly downtime. It should be noted that in the preferred embodiment of FIG. 2 the phase-reversal element 58 is shown directly after the sensor 18; however, alternate embodiments include the phase-reversal element 58 placed at any of the various points in the receive path. In this manner, crosstalk introduced after the phase-reversal element 58 may be quantified and/or nullified by the DSP 51. Also, the phase-reversal element 58 may be implemented using various methods such as mechanical relays and/or solid state devices.

Figure 4:
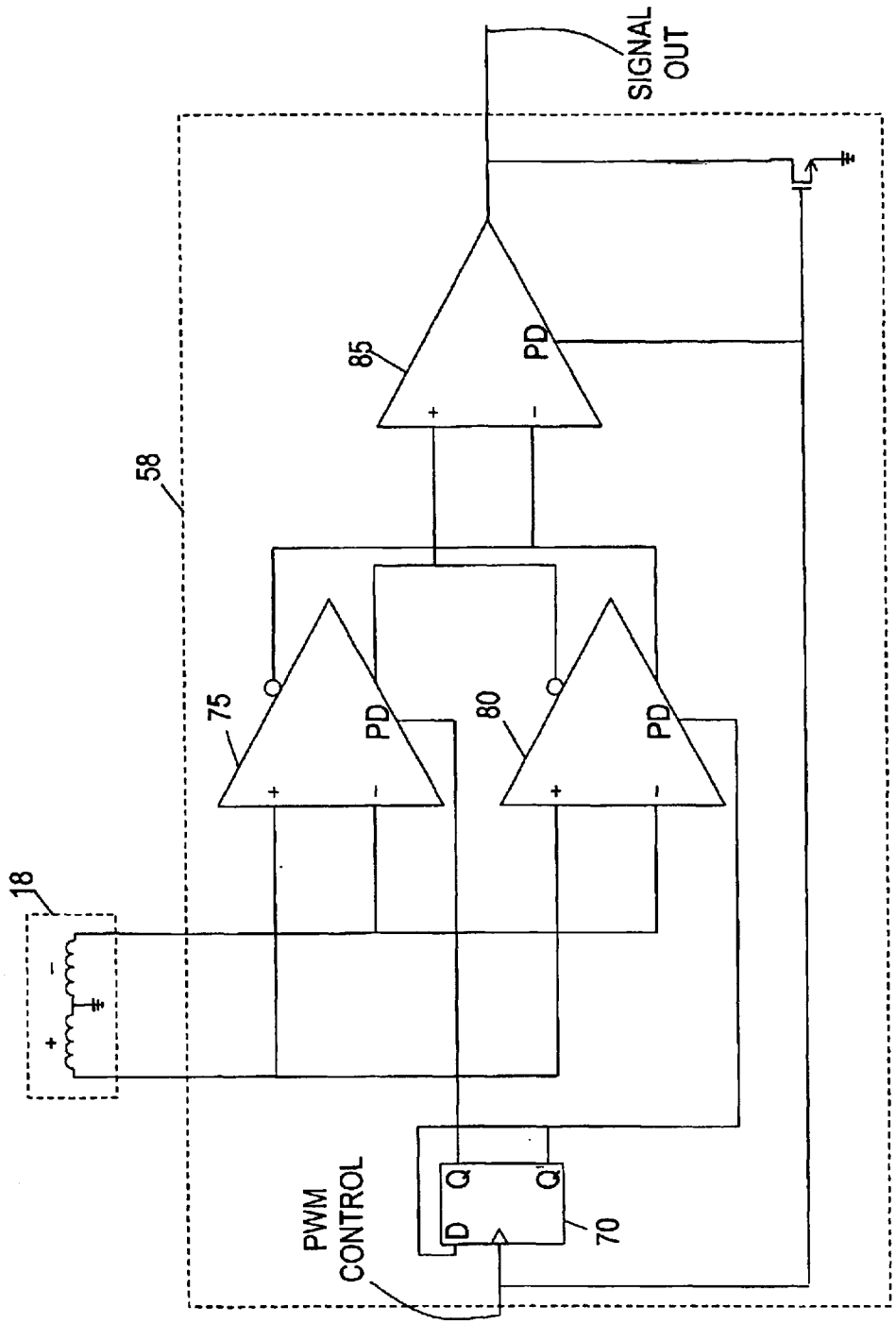
FIG. 4 shows an embodiment of implementing a phase-reversal element using solid state devices.

FIG. 4 shows an exemplary embodiment of phase-reversal element 58 connected to an exemplary receiver 18 embodied as two coils with opposite polarity, as is familiar to one of ordinary skill in the art. A pulse width modulated (PWM) control signal from the programmable phase control element 60 is tied to the clock input of a D type flip-flop 70, which also has its output Q' connected to the D input so as to toggle states on each rising clock edge of the PWM control signal. The Q output of flip-flop 70 is coupled to the power down pin of a differential amplifier 75, and the Q' output of flip-flop 70 is coupled to the power down pin of another differential amplifier 80. In this manner, the toggling signal from flip-flop 70 serves to toggle powering up either differential amplifier 75 or differential amplifier 80 for half of the period of the PWM control signal. The inputs of differential amplifiers 75 and 80 are connected to the outputs of receiver 18 similarly. That is, the positive output of the receiver 18 is connected to the positive inputs of differential amplifiers 75 and 80, and the negative output of the receiver 18 is connected to the negative inputs of differential amplifiers 75 and 80. However, the differential outputs of differential amplifiers 75 and 80 are oppositely connected to the input of a third differential amplifier 85. Thus, as operation of differential amplifiers 75 and 80 are toggled as described above, differential amplifier 85 receives either the original signal from receiver 18 or a phase-reversed version. The output of differential amplifier 85 produces a single ended signal out to be sent to the rest of the receive path. Differential amplifier 85 also has its power down circuitry connected to the PWM control signal such that differential amplifier 85 may be powered down completely while coupling the output to ground.

Figure 5:
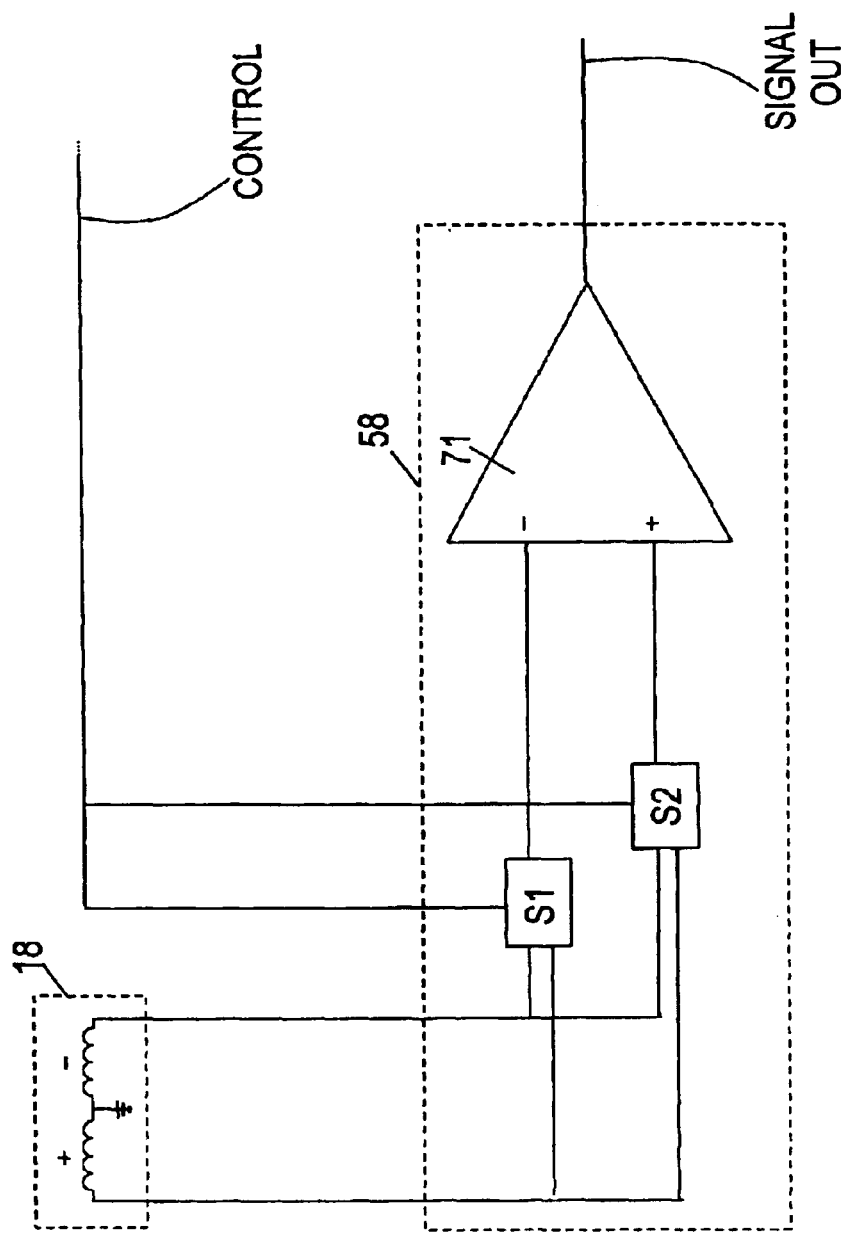
FIG. 5 shows an embodiment of implementing a phase-reversal element using switches.

FIG. 5 shows another exemplary embodiment of phase-reversal element 58 connected to an exemplary receiver 18. A control signal from the programmable phase control element 60 is tied to switches S1 and S2. Switches S1 and S2 may be any type that allows the control signal to alternate between polarity configurations for coupling receiver 18 to the phase-reversal element 58. For example, S1 and S2 may be relays. In any case, switches S1 and S2 serve to provide either the received signal or a phase-reversed version to amplifier 71.

Therefore, the embodiments of the present invention provide a method and apparatus that employs phase cycling to reduce crosstalk and other sources of noise in downhole tools. Also, the ADC 56, DAC 52, and programmable phase control element 60 are shown included in DSP 51, however any or all of these elements may be separate from DSP 51. Moreover, while the specification has discussed quantifying crosstalk so as to remove the crosstalk from the signal reaching the digital signal processor 51, the amount of crosstalk may also be indicative of the logging tool's condition. That is, the resultant signal created by combining the receive signal and a phased reversed version of the receive signal may be indicative of the logging tool's condition.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent methods of implementing the phase-reversal element 58, many modifications may be made in the embodiments herein detailed in accordance with the descriptive requirements of the law, and it is to be understood that the details herein are to be interpreted as illustrative and not in a limiting sense.

What is claimed is:

1. A downhole logging tool comprising:

a tool body;

a transmitter disposed on the tool body;

a receiver disposed on the tool body operable to create a receive signal;

a receive circuit coupling the receiver to a processor, the receive circuit comprising:

an amplifier coupled to the receiver;

a signal conditioner coupled to the amplifier; and a phase reversal circuit operable to selectively create a phase reversed version of the receive signal, wherein the phase reversal circuit couples in the receive circuit at a location being one of: between the amplifier and the signal conditioner, and between the signal conditioner and the processor;

wherein the processor is operable to compare the received signal to the phase reversed version of the receive signal to determine an amount of noise induced in the receive signal; and wherein the processor determines a tool condition based on the amount of noise induced in the receive signal.

2. A method comprising:

transmitting from a transmitter on a downhole logging tool an electromagnetic signal into an earth formation;

receiving at a receiver on the downhole tool the electromagnetic signal in a first period to create a first received signal;

receiving at the receiver on the downhole tool the electromagnetic signal in a second period;

phase delaying the electromagnetic signal received in the second period to create a second received signal;

combining the first and second received signals to create a resultant signal indicative of the noise induced in the receive path; and utilizing the resultant signal of the combining step as an indication of tool condition.

3. The method as defined in claim 2 wherein the combining step further comprises adding the first and second received signals to create the resultant signal.

4. The method as defined in claim 2 wherein phase delaying further comprises phase delaying the electromagnetic signal between the receiver and a pre-amplifier coupled to the receiver.

5. The method as defined in claim 3 wherein phase delaying further comprises phase delaying the electromagnetic signal between an amplifier and a signal conditioner, the amplifier coupled to the receiver and the signal conditioner, and the signal conditioner coupled to a processor.

* * * * *